UNITED STATES PATENT OFFICE.

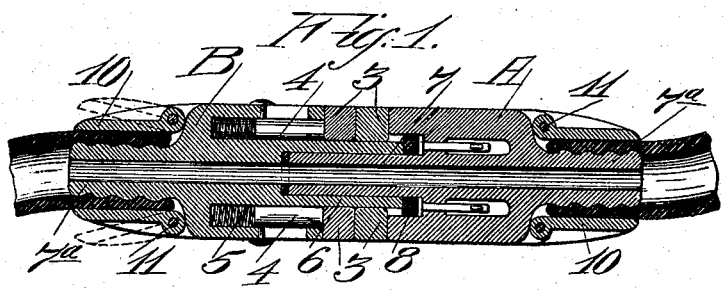

SAMUEL B. LEAR, OF SAN FRANCISCO, CALIFORNIA.

HOSE AND LIKE COUPLING.

No. 867,059.  Specification of Letters Patent.  Patented Sept. 24, 1907.

Application filed April 4, 1907. Serial No. 366,293.

To all whom it may concern:

Be it known that I, SAMUEL B. LEAR, a citizen of the United States, residing at the city and county of San Francisco and State of California, have invented new and useful Improvements in Hose and Like Couplings, of which the following is a specification.

My invention relates to a coupling device suitable to be used for connecting pipe hose, or forming equivalent joints between parts which are to be extended in line with each other.

It consists in a combination of parts, and in details of construction which will be more fully described hereafter; having reference to the accompanying drawings.

Figure 1 is a longitudinal section through my hose coupling. Fig. 2 is a partial longitudinal section at right angles to Fig. 1. Fig. 3 is an exterior view. Fig. 4 is an end view.

A and B are the exterior shells of the two parts of my coupling, and these are formed with extensions 2; and diagonal interlocking portions 3 projecting from the extensions 2 so that when the parts A and B are turned with relation to each other, each of the inclined tongues 3 moves into the corresponding diagonal channel formed between the body of the other member of the coupling and its tongue, thus interlocking the two firmly together. When the two parts are thus turned to interlock, it will be seen that an open space will be left between the extensions 2 upon each side, and within this space bolts 4 are caused to slide so as to prevent the interlocking members from being turned backwardly. These bolts 4 are slidable in channels within the part B as shown, and are normally forced out by springs 5 contained in chambers behind the bolts 4. These bolts will be normally forced out, and when the parts are to be coupled, the diagonal interlocking ribs first contacting with the ends of the bolts 4, as the parts are pushed together, will depress these bolts against the elasticity of the springs, until the interlocking parts 3 can be turned into their respective channels, and as soon as they have been turned so far as to sufficiently separate the extensions 2 upon each side, the springs will force the bolts forward into these spaces, and thus prevent the unlocking of the coupling. The central portions of the members A and B form the conducting channels when used for hose or pipe coupling.

The part B has a cylindrical tubular portion 6 of sufficient interior diameter to receive a corresponding tubular portion 7 which projects centrally within the part A, and in line with the part 6, so that when the interlocking members are pushed together, the part 7 enters the part 6. In order to form a tight joint at this point, a packing-ring 8 may be fitted around the part 7, so that when the two parts are connected, this ring will fit against the end of the tubular part 6, and thus prevent leakage at that point. The packing-ring is held firmly against the part 6 by means of a lever 9 suitably fulcrumed upon the part A having arms entering the chamber around the tubular extension 7, which chamber fits the end of the tubular part 6, and by pressing the lever 9 down, the inner end will act through its connections to complete the joint as described. In order to properly connect the hose or other part with this coupling, I have shown a tubular extension $7^a$ of smaller diameter than the main body A, and substantially a continuation of the part 7.

10 are two semicircular segments pivoted to the part A as shown at 11 so that their outer ends may open outwardly from the part $7^a$ to form a channel around it. Into this channel the end of the hose may be inserted inclosing the part $7^a$, and in turn inclosed by the segmental wings 10 which grip the hose closely upon the part $7^a$, the latter being preferably corrugated in the usual manner for such ends to insure a close hold of the hose upon it. The parts 10 have transverse holes made through their opposite sides, as shown at 12, and small screws or bolts passing through these holes, serve to draw the gripping segments tight upon the hose, thus insuring its remaining in place.

The lever 9 has a projection $9^a$ upon the opposite side of its fulcrum, and this projection is engaged by a spring-pressed latch $9^b$ when the lever is pressed down to complete the lock. By means of a button $9^c$ connected with the latch, and slidable in a slot $9^d$ the latch may be withdrawn and the lever released.

Having thus described my invention, what I claim and desire to secure by Letters Patent is—

1. In a hose or pipe coupling, members having extensions from their contiguous ends, said extensions having diagonal tongues turnably interlocking with each other, spring-pressed slidable bolts entering the spaces between the extensions to maintain the parts in locked position, the joint-forming gasket between the two members, and means carried by one of said members for forcing the gasket into sealing contact with the other member.

2. In a hose and like coupling, members having turnably interlocking tongues and holding bolts, interior tubular portions, one of which slides into the other when the members are interlocked, a joint-forming gasket surrounding the inner tube, and a lever whereby said gasket is forced into sealing contact with the end of the outer tube.

3. In a hose and like coupling, turnably interlocking members with spring-pressed holding bolts, means for forming a tight joint between the tubular interior portions, said means comprising a gasket and a device by which the gasket is forced into sealing contact with one of said members, means for securing the hose to the ends of said members, said means comprising hinged segments adapted to clamp the hose and transverse bolts by which said segments are compressed.

4. In a hose and like coupling, members having turnably interlocking tongues, and holding bolts, interior telescoping tubular portions, a joint-forming gasket, a lever whereby said gasket is forced into sealing contact with the tube end, and a spring-pressed locking latch engaging the lever, with a disengaging device for the latch.

In testimony whereof I have hereunto set my hand in presence of two subscribing witnesses.

SAMUEL B. LEAR.

Witnesses:
S. H. NOURSE,
FREDERICK E. MAYNARD.